O. TOWNER.
DOUBLETREE.
APPLICATION FILED OCT. 17, 1913.

1,101,975.

Patented June 30, 1914.

WITNESSES

INVENTOR.
ORRIN TOWNER.
by Fred. B. Fetherstonhaugh
atty

UNITED STATES PATENT OFFICE.

ORRIN TOWNER, OF ST. CATHARINES, ONTARIO, CANADA.

DOUBLETREE.

1,101,975.

Specification of Letters Patent.

Patented June 30, 1914.

Application filed October 17, 1913. Serial No. 795,730.

*To all whom it may concern:*

Be it known that I, ORRIN TOWNER, of the city of St. Catharines, in the county of Lincoln, in the Province of Ontario, Canada, have invented certain new and useful Improvements in Doubletrees and the like, of which the following is the specification.

My invention relates to improvements in double trees and the like and the object of my invention is first to provide a simple inexpensive form of double tree which will be strong, durable and comparatively light in weight and in which the strain brought to bear thereon will be equally distributed throughout its length and in which the several parts comprising the double tree may be easily and quickly replaced when broken or worn during use.

It consists essentially of a double tree bar having diagonal bores extending out through the ends of the double tree, a bearing member secured centrally of the double tree having lugs extending outwardly at each end thereof, a truss bar extending through the lugs and at its ends through the diagonal bores so as to project beyond the ends of the double tree and having suitably threaded ends and nuts threaded on the ends, a clevis swung upon the bar between the aforesaid bearing lugs and spacing sleeve surrounding the bar between the ends of the clevis as hereinafter more particularly explained by the following specification.

Figure 1:
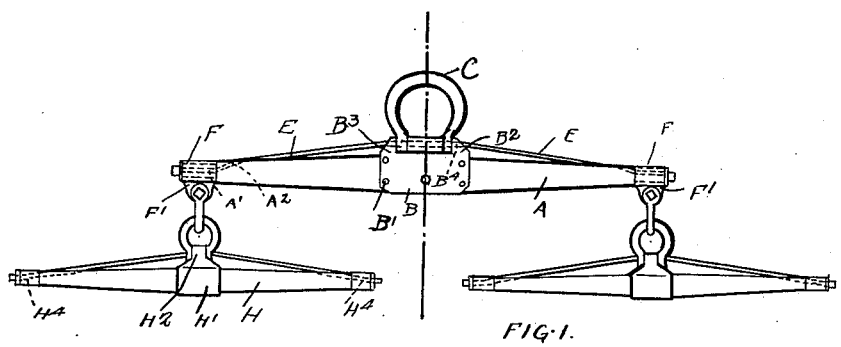
Figure 2:
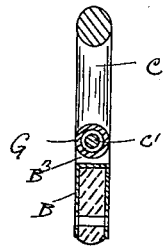
Figure 3:

Figure 1, is a plan view of the double tree and swingle trees attached thereto. Fig. 2, is a vertical section through the center of the double tree. Fig. 3, is a perspective detail of the spacing sleeve.

In the drawings like letters of reference indicate corresponding parts in each figure.

A is a double tree bar formed of any suitable material preferably of wood and provided with reduced ends A' through which extend diagonal bores $A^2$.

B is a bracket secured centrally of the bar A by rivets B'. The bracket B is provided with outwardly extending lugs $B^2$ and $B^3$ having central orifices $B^4$.

C is a clevis, the arms of which are provided with an orifice C'.

E is a truss bar extending through the orifices $B^4$ and C' of the lugs $B^2$ and $B^3$ and clevis C respectively. The ends of the truss bar E are slightly bent to extend through the oblique bores $A^2$. The projecting ends E' of the bar are suitably threaded and provided with nuts $E^2$.

G is a spacing sleeve extending between the ends of the clevis C so as to hold them apart against the lugs $B^2$ and $B^3$.

F are sleeves surrounding the reduced end of the bar A and provided with lugs F'.

H are swingle trees which are constructed with the sleeves H' suitably secured thereon centrally of their length and provided with an outwardly projecting lug $H^2$.

$H^3$ is a clevis extending to each side of the lug $H^2$.

I is a truss rod extending through the lug $H^2$ and at the ends through the bores $H^4$ corresponding to the bores $A^2$ and provided with nuts $I^2$.

When in operation it will be seen that while the strain on the double tree is distributed equally throughout its length the direct torque will be brought to bear on the lugs $B^2$ and $B^3$ and the ends of the clevis, having a tendency to draw the end of the clevis together. In order to prevent this I have provided the tubular sleeve G surrounding the bar E as above described, the tubular sleeve G not only serves to reinforce the bar E but also reinforces the clevis. The ends being held in a definite position between the lugs and the sleeve.

What I claim as my invention is:

A double tree comprising a bar having flat sides and diagonal end bores, a center bracket U-shaped in cross section and into which the flat sided bar fits, securing bolts extending through the sides of the bracket and the bar, lugs extending from the ends of the base of the U-bracket having horizontal orifices, a truss rod extending through the orifices of the lugs and at the ends through the bores, a clevis swung on the truss rod and bearing against the inner side of the bracket lugs, a spacing sleeve mounted on the truss rod and fitting at its ends against the ends of the clevis, sleeves surrounding the ends of the truss rod and bar, washers fitting on the ends of the truss rod against the ends of the double tree bar and nuts threaded on the ends of the truss rod and against the washers, as and for the purpose specified.

ORRIN TOWNER.

Witnesses:
NORA SHEEHAN,
NETTIE F. BOYLE.

Copies of this patent may be obtained for five cents each, by addressing the "Commissioner of Patents, Washington, D. C."